EDWARD FALES.
Improvement in Fences.
No. 125,800.                              Patented April 16, 1872.
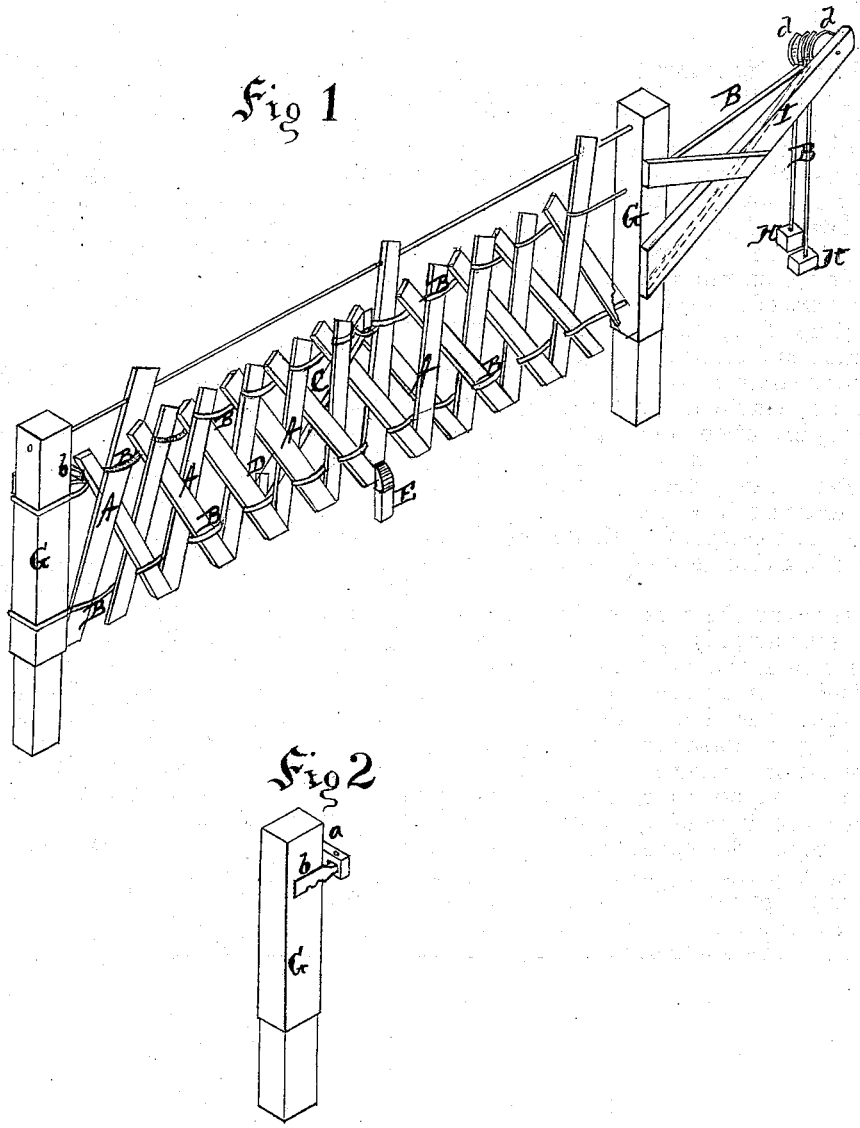
Witnesses:
Inventor
Edward Fales.

125,800

UNITED STATES PATENT OFFICE.

EDWARD FALES, OF GLENWOOD, MISSOURI.

IMPROVEMENT IN FENCES.

Specification forming part of Letters Patent No. 125,800, dated April 16, 1872.

*To all whom it may concern:*

Be it known that I, EDWARD FALES, of Glenwood, in the county of Schuyler and in the State of Missouri, have invented certain new and useful Improvements in Fence; and do hereby declare that the following is a full, clear, and exact description thereof, reference being had to the accompanying drawing and to the letters of reference marked thereon making a part of this specification.

The nature of my invention consists in the construction and arrangement of a fence, as will be hereinafter more fully set forth.

In order to enable others skilled in the art to which my invention appertains to make and use the same, I will now proceed to describe its construction and operation, referring to the annexed drawing, in which—

Figure 1 is a perspective view of my fence, and Fig. 2 is a side view of one of the fence-posts.

A A represent the pickets of my fence, interlaced substantially in the manner shown, and connected at the top and bottom by wires B B, which pass on one side of one picket, and on the other side of the other picket, thus running in a zigzag form, and preventing the pickets from coming together on the wires. The fence is supported by braces C, having the upper wire B passing around its upper end, and around the upper end of one of the pickets A, thus holding said picket and the brace firmly together. The lower end of each brace C is secured to a stake, D, driven into the ground. The lower ends of the pickets A may be made fast to stakes E driven into the ground, as shown in Fig. 1. To one of the fence-posts G is attached an arm, $a$, with a bar, $b$, projecting inward along or parallel with the inner side of the post. This bar is notched to rest on the upper wire B, and hold the last picket on the wire. The wires B B are wrapped around the fence-post G, which has the arm $a$, and the wires pass through holes in the other fence-post, and are provided with weights H H at their ends. These ends of the wires are passed over pulleys $d\ d$ placed on an arm, I, extending from the fence-post. The weights H H keep the wires always taut, and prevent their breaking from the cold.

Having thus fully described my invention, what I claim as new, and desire to secure by Letters Patent, is—

1. A series of pickets, A A, interlaced, substantially as shown, and connected by wires B B, running in zigzag form, as and for the purposes herein set forth.

2. The arm $a$ and notched bar $b$, attached to the fence-post G, and used in combination with the pickets A and wires B, substantially as and for the purposes herein set forth.

In testimony that I claim the foregoing I have hereunto set my hand this 29th day of September, 1871.

EDWARD FALES.

Witnesses:
 C. L. EVERT,
 JOHN DIXON.